US010295043B2

(12) United States Patent
Klein et al.

(10) Patent No.: US 10,295,043 B2
(45) Date of Patent: May 21, 2019

(54) METHOD FOR DETERMINING BELT WEAR IN A BELT DRIVE

(71) Applicant: Robert Bosch GmbH, Stuttgart (DE)

(72) Inventors: Benjamin Klein, Bietigheim-Bissingen (DE); Tobias Trzebiatowski, Stuttgart (DE)

(73) Assignees: Robert Bosch GmbH, Stuttgart (DE); SEG Automotive Germany GmbH, Stuttgart (DE)

( * ) Notice: Subject to any disclaimer, the term of this patent is extended or adjusted under 35 U.S.C. 154(b) by 89 days.

(21) Appl. No.: 15/493,265

(22) Filed: Apr. 21, 2017

(65) Prior Publication Data

US 2017/0307060 A1 Oct. 26, 2017

(30) Foreign Application Priority Data

Apr. 22, 2016 (DE) ........................ 10 2016 206 849

(51) Int. Cl.
*G01M 15/02* (2006.01)
*F16H 57/01* (2012.01)
*F16H 7/12* (2006.01)
*F16H 7/08* (2006.01)
*F02B 67/06* (2006.01)

(52) U.S. Cl.
CPC ........... *F16H 57/01* (2013.01); *F16H 7/1281* (2013.01); *F02B 67/06* (2013.01); *F16H 2007/0808* (2013.01); *F16H 2007/0865* (2013.01); *F16H 2007/0874* (2013.01); *F16H 2007/0897* (2013.01); *F16H 2057/012* (2013.01); *F16H 2057/014* (2013.01)

(58) Field of Classification Search
USPC ........................................................ 73/114.77
See application file for complete search history.

(56) References Cited

U.S. PATENT DOCUMENTS 4,480,487 A * 11/1984 Kunzfeld .................. G01L 5/08 73/862.453
5,307,672 A * 5/1994 Macchiarulo ............ G01N 3/56 324/456
2003/0155772 A1 8/2003 Scherrbacher et al.
2010/0060677 A1* 3/2010 Jones .................. G01M 13/023 347/5
2018/0119790 A1* 5/2018 Kanduri .................. F16H 57/01
2018/0135587 A1* 5/2018 Klein ...................... F02N 15/08

FOREIGN PATENT DOCUMENTS

DE 10045143 2/2002
DE 10112568 10/2002
DE 102011101563 A1 11/2012
DE 102014217455 A1 3/2016

* cited by examiner

*Primary Examiner* — Eric S. McCall
(74) *Attorney, Agent, or Firm* — Michael Best & Friedrich LLP

(57) ABSTRACT

A method for determining belt wear in a belt drive, wherein the belt is loaded with a defined torque and the rotation angle of a pulley is determined.

12 Claims, 2 Drawing Sheets

METHOD FOR DETERMINING BELT WEAR IN A BELT DRIVE

BACKGROUND OF THE INVENTION

The invention relates to a method for determining belt wear in a belt drive, for example in a belt-driven starter generator of an internal combustion engine.

A belt-driven starter generator, which can be used both for starting an internal combustion engine and as a generator when the internal combustion engine is running, is described in DE 100 45 143 A1. The starter generator has a motor-driven pulley around which is wrapped a toothed belt that is also wrapped around a crankshaft takeoff shaft of the internal combustion engine. The starter generator is provided with a tensioning system in order to ensure that the toothed belt is sufficiently pre-tensioned in both directions of movement. The tensioning system comprises two tensioning rollers which bear against the toothed belt and are rotatably attached to a hub via lever arms. The entire tensioning system can be pivoted about an axis of rotation arranged in the center of the hub.

From DE 101 12 568 A1, it is known to determine the slippage in the drive of starter generator systems, and to restrict the transferred driving moments such that the slippage lies within an acceptable value. This is also supposed to limit belt wear.

SUMMARY OF THE INVENTION

With the aid of the method according to the invention, it is possible to determine the actual belt wear in a belt drive. The belt drive is for example a belt-driven starter generator of an internal combustion engine, which can be used to start the internal combustion engine and can also be used as a generator when the internal combustion engine is running. The belt drive comprises a pulley and at least one tensioning arm which is mounted pivotably on the pulley and on which a tensioning roller is arranged so as to be able to rotate, wherein the belt of the belt drive is guided around the pulley and the tensioning roller. The tensioning roller provides sufficient tension in the belt.

The pulley is advantageously coupled to a drive motor, in particular an electric drive motor, which produces a torque in order to determine the belt wear. An electric drive motor can also be used as a generator.

In the context of the method according to the invention, in order to detect the belt wear the belt is loaded with a defined torque and the rotation angle of the pulley, which arises as a reaction to the torque, is determined. Alternatively or in addition to the rotation angle of the pulley, it is also possible to determine a variable that correlates therewith. The rotation angle of the pulley—or the variable that correlates therewith—serves as a measure for the current degree of wear of the belt. Increasing belt wear causes the belt to lengthen, and consequently the rotation angle of the pulley—or the variable that correlates therewith—as a reaction to the applied torque also increases.

The torque for detecting the belt wear is preferably applied in the form of a defined torque impulse of fixed time duration, with a fixed profile of the torque impulse, and a fixed magnitude of the torque impulse. The profile of the torque impulse is for example at least approximately rectangular.

Knowing the current degree of wear of the belt makes it possible to adapt, and in particular restrict, the maximum torque in the belt drive during regular operation, in order to minimize further wear and slippage in the belt drive. It is for example possible to establish a wear-dependent torque upper limit which is not to be exceeded during operation of the belt drive.

The applied torque for determining the belt wear is limited both in terms of its magnitude and in terms of its duration. The torque is for example applied for at most one second or at most 0.5 seconds, and the magnitude of the torque is for example at most 10 Nm or at most 5 Nm.

The torque is in particular produced by the electric motor that is coupled to the pulley.

According to one advantageous embodiment, that relates to a belt drive having two tensioning arms which are mounted so as to be able to rotate about the pulley of the electric motor and which each have a tensioning roller, the belt is successively loaded in each case with one torque in opposite directions. Alternatively, the tensioning arms can also be mounted so as to be able to rotate about an axis that is not coaxial with the drive shaft of the electric motor.

The torques are in particular generated in immediate succession, for example within a time interval of at most 2 seconds or at most 0.5 seconds, and in opposite directions.

As a reaction to the applied torques, the overall rotation angle of the pulley—or a variable that correlates with the rotation angle—is determined as a measure of the belt wear. Generating two torques in opposite directions produces a larger rotation angle—or correlating variable—overall, which is more easily detected by sensors, thus increasing measurement accuracy. Advantageously, the torques in the two opposite directions are equal, both in terms of the magnitude of the torque and in terms of the duration of the applied torque. In an alternative embodiment, however, the torques in the opposite directions can be different, in terms of magnitude and/or duration. Advantageously, the belt can be pre-tensioned in one direction prior to the testing sequence, such that one end position is already reached, in order to reduce interference, for example friction, and thus increase measurement accuracy.

Instead of the rotation angle of the pulley, or in addition thereto, it is for example possible for the time that the pulley takes to reach an end position corresponding to the torque to be determined as a measure for the belt wear. The angular rotation of the tensioning system in the belt drive, which comprises at least one tensioning arm with the tensioning roller, also correlates with the rotation angle of the pulley and can be used to determine belt wear.

According to another advantageous embodiment, which relates to a belt drive as starter generator of an internal combustion engine, the magnitude of the applied torque is restricted to a maximum value which is lower than the breakaway torque of the crankshaft of the internal combustion engine. This ensures that the application of the torque for determining belt wear has no effect on the position of the crankshaft.

According to another advantageous embodiment, which also relates to a belt drive with a starter generator of an internal combustion engine, the torque is applied only in defined operating states of the internal combustion engine, in particular when the internal combustion engine is not running. However, it can also be advantageous to determine the belt wear by application of a torque when the engine is running, in particular in stationary operating states of the internal combustion engine, for example when idling.

According to another advantageous embodiment, in order to establish the belt wear, a defined torque is applied multiple times and the rotation angle of the pulley—or a variable that correlates therewith—is determined. By repeatedly generating the torques and measuring the rotation angle—or the variable that correlates therewith—it is possible to minimize the influence of statistical scatter and improve precision in determining wear. Advantageously, the measurements are carried out under identical basic conditions, in particular with identical magnitude and identical duration of the torques, and in the same operating state of the internal combustion engine, in particular when the internal combustion engine is switched off.

BRIEF DESCRIPTION OF THE DRAWINGS

Further advantages and expedient embodiments can be found in the other claims, the description of figures and the drawings, in which:

In the figures, identical components are provided with identical reference signs.

DETAILED DESCRIPTION

Figure 1:
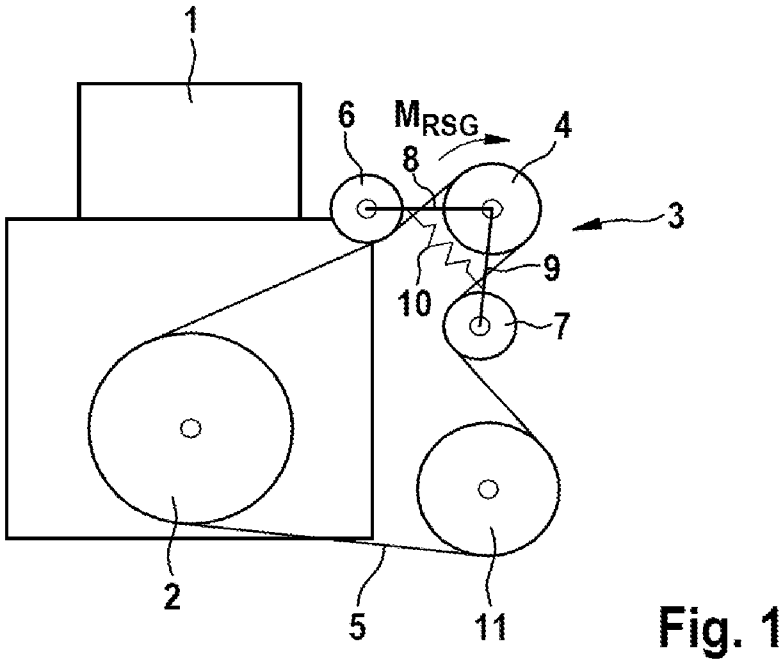
FIG. 1 is a schematic illustration of a belt-driven starter generator which is coupled to the crankshaft of an internal combustion engine via a belt, shown in a first deflection of a tensioning system which is attached coaxially with the starter generator, in the case of a transmitted torque in a first direction.
Figure 2:
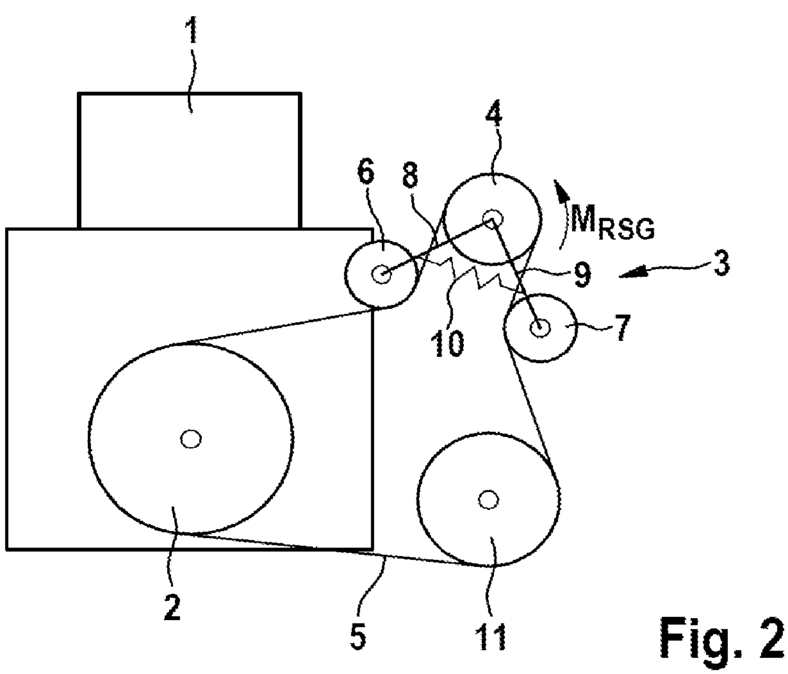
FIG. 2 is an illustration that corresponds to FIG. 1, but in the case of a transmitted torque in the opposite direction, the tensioning system also being deflected in the opposite direction compared to FIG. 1.

FIGS. 1 and 2 both show an internal combustion engine 1 which is started by a belt-driven starter generator 3, and which drives the starter generator 3 when the latter is operated as a generator. FIG. 1 illustrates the motive situation for starting and for providing motive support to the internal combustion engine, FIG. 2 shows the generative situation in which the starter generator 3 is driven by the internal combustion engine 1 and generates electricity. Accordingly, a torque MRSG in the starter generator 3 is transmitted in different directions via a pulley 4.

The internal combustion engine 1 and the belt-driven starter generator 3 are coupled via a belt 5 of the starter generator that is wrapped around a crankshaft takeoff pulley 2 of the internal combustion engine. The starter generator 3 further comprises the pulley 4 which, in particular, is fixed in rotation with an electric motor or is connected thereto via a gearing, and which operates as a drive motor in the motive situation as shown in FIG. 1, and as a generator in the generative situation as shown in FIG. 2.

The belt 5 is wrapped around the pulley 4, which is rotatably mounted. On the starter generator 3, two tensioning arms 8 and 9 are mounted so as to be able to pivot coaxially with the pulley 4, the pivot axis of the tensioning arms 8 and 9 coincides with the axis of rotation of the pulley 4. The pivotability of the tensioning arms 8 and 9 is independent of the rotatability of the pulley 4 about its axis of rotation.

The tensioning arms 8 and 9 each bear, on their side oriented away from the pulley 4, a tensioning roller 6 and 7, which each apply, from outside, an inward-oriented force on the belt 5, in order to tension the belt 5. The tensioning forces exerted on the belt 5 by the tensioning rollers 6 and 7 are oriented toward one another. The tensioning arms 8 and 9 with the tensioning rollers 6 and 7 represent a tensioning system or a belt tensioner, in which the belt 5 is loaded with a tensioning force transversely to its longitudinal extent. In order to generate the tensioning force, the tensioning rollers 6 and 7, or the associated tensioning arms 8 and 9, are provided with a pre-tension which is in particular calibrated such that, even when not in operation, the belt 5 is loaded with a tensioning force by the tensioning rollers 6 and 7.

In the exemplary embodiment, the two tensioning arms 8 and 9 are mounted on the pulley 4 so as to be able to pivot independently of one another, and are coupled in terms of force by a spring element 10, which is for example designed as a tension spring.

In addition, the belt 5 can be wrapped around and drive one or more auxiliary assemblies 11. The auxiliary assemblies 11 can for example be a power steering assembly, the water pump or the air-conditioning in the vehicle.

In the driving situation as shown in FIG. 1, the belt section between the crankshaft takeoff pulley 2 and the pulley 4 constitutes the tight run, and the belt section between the pulley 4 and the auxiliary assembly 11 constitutes the slack run. By contrast, in generative operation as shown in FIG. 2, the belt section between the crankshaft takeoff pulley 2 and the pulley 4 is the slack run and the belt section between the pulley 4 and the auxiliary assembly 11 is the tight run.

Figure 3:
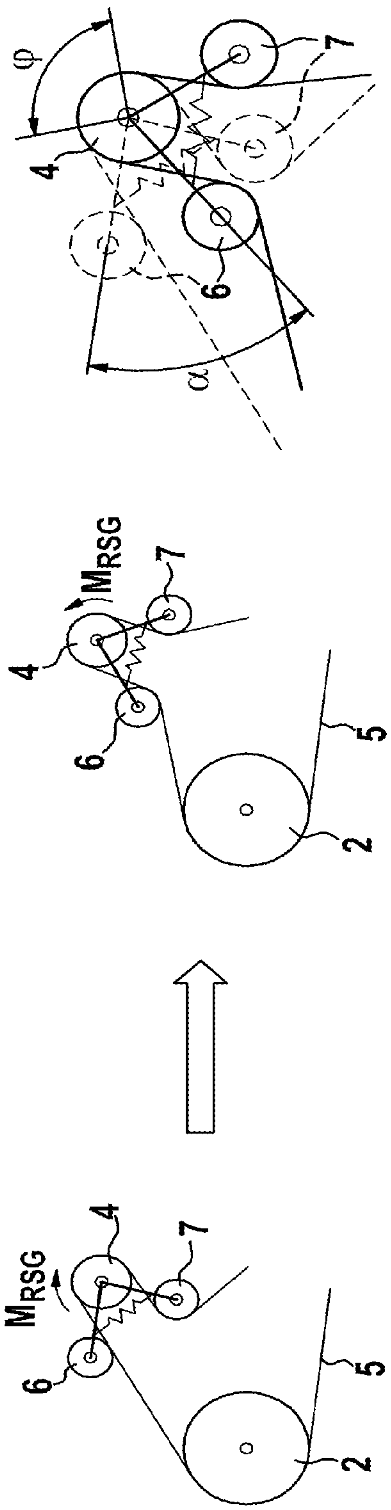
FIG. 3 shows two illustrations of the starter generator after application of, in each case, a torque in different directions, and shows a superimposed illustration of both states for the purpose of establishing the rotation angle of the pulley as a measure of the wear of the belt.

FIG. 3 shows three individual images, of which the left-hand image illustrates motive operation after application of a defined torque, and the middle image illustrates generative operation after application of the torque, but in the opposite direction. The right-hand image is a superposition of the left-hand and middle images, with the pulley 4 and the two tensioning rollers 6 and 7 of the belt tensioner.

The torque is applied in order to determine the belt wear. The magnitude of the torque is smaller than the breakaway torque of the internal combustion engine. Both in motive operation and in generative operation, the torque is preferably applied when the internal combustion engine is not running. For motive and generative operation, the torque can be equal both with respect to its duration and its magnitude, but is of opposite orientation. The torque is generated by actuation of the electric motor connected to the pulley 4. The duration of the torque is preferably at most one second, for example half a second. The magnitude of the torque is preferably at most 10 Nm, for example 5 Nm.

In order to determine the belt wear, it is expedient to apply a torque at regular time intervals, preferably in immediate succession in both opposite directions of the motive and generative operation, and to establish the rotation angle of the pulley 4. A change in the rotation angle can be used to identify the current wear state of the belt. If reference values are available, it is also possible to use the absolute values of the rotation angle of the pulley to identify the current belt wear.

Once the belt wear has been established, it is possible to restrict the maximum torque acting in the belt drive in order to prevent failure of the belt drive.

The right-hand image of FIG. 3 illustrates, in superposition, the motive and generative situations when applying the torques for the purpose of determining belt wear, wherein the motive situation is shown with dashed lines and the generative situation is shown with solid lines. The rotation angle $\varphi$ of the pulley between the motive and generative situations after application of a positive or, respectively, negative torque can be detected by means of sensors and serves as a measure for the belt wear. Additionally or alternatively, it is also possible to use another variable that correlates with the rotation angle φ, for example the time that the pulley 4 needs to reach its respective deflection.

The right-hand image of FIG. 3 also shows the angle α traversed by the tensioning roller 6 of the belt tensioner when passing from the motive situation to the generative situation. It is also possible for this angle α to be used to determine the belt wear.

What is claimed is:

1. A method for determining belt wear in a belt drive, the method comprising loading a belt (5) with a defined torque on a pulley (4), and determining, with a sensor, a rotation angle (φ) of the pulley (4) as a measure for the belt wear, wherein the belt drive (5) includes the pulley (4) and at least one tensioning arm (8, 9) which is mounted pivotably on the pulley (4) and which is connected to a tensioning roller (6, 7), and wherein the belt (5) is guided around the pulley (4) and the tensioning roller (6, 7).

2. The method according to claim 1, wherein the belt (5) is loaded multiple times with defined torques, wherein the belt wear is determined from multiple measurements of the rotation angle (φ) of the pulley (4).

3. The method according to claim 1, wherein the belt drive is configured as a belt-driven starter generator (3) of an internal combustion engine (1), wherein the defined torque is applied only in defined operating states of the internal combustion engine (1).

4. The method according to claim 3, wherein the defined torque is applied only when the internal combustion engine (1) is not running.

5. The method according to claim 1, wherein the belt drive is configured as a belt-driven starter generator (3) of an internal combustion engine (1), wherein a magnitude of the defined torque is lower than a breakaway torque of a crankshaft of the internal combustion engine (1).

6. The method according to claim 5, wherein the defined torque is applied only when the internal combustion engine (1) is not running.

7. The method according to claim 5, wherein depending on the determined belt wear, the magnitude of a maximum permitted starting moment in the starter generator (3) is restricted.

8. A method for determining belt wear in a belt drive, the method comprising loading a belt (5), on a pulley, in opposite directions with defined torques, and determining, with a sensor, an overall rotation angle (φ) of the pulley (4) as a measure for the belt wear, wherein the belt drive includes two tensioning arms (8, 9) which are mounted pivotably on the pulley (4) and which are each connected to a tensioning roller (6, 7), and wherein the belt (5) is guided around the pulley (4) and the two tensioning rollers (6, 7).

9. The method according to claim 8, wherein the defined torques that the belt (5) is loaded with in the opposite directions have the same magnitude or are in a defined relationship to one another.

10. The method according to claim 8, wherein the two pivotably mounted tensioning arms (8, 9) are connected to each other via a spring element (10).

11. The method according to claim 8, wherein the tensioning rollers (6, 7) apply a force in opposite directions to the belt (5).

12. A method for determining belt wear in a belt drive, the method comprising loading a belt (5) with a defined torque on a pulley (4), and determining, with a sensor, a time that the pulley (4) takes to reach a deflection corresponding to the defined torque as a measure for the belt wear, wherein the belt drive (5) includes the pulley (4) and at least one tensioning arm (8, 9) which is mounted pivotably on the pulley (4) and which is connected to a tensioning roller (6, 7), and wherein the belt (5) is guided around the pulley (4) and the tensioning roller (6, 7).

* * * * *